US006996763B2

(12) United States Patent
Sarkar et al.

(10) Patent No.: US 6,996,763 B2
(45) Date of Patent: Feb. 7, 2006

(54) OPERATION OF A FORWARD LINK ACKNOWLEDGEMENT CHANNEL FOR THE REVERSE LINK DATA

(75) Inventors: Sandip Sarkar, San Diego, CA (US); Tao Chen, San Diego, CA (US); Edward G. Tiedemann, Jr., Concord, MA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 490 days.

(21) Appl. No.: 10/341,329

(22) Filed: Jan. 10, 2003

(65) Prior Publication Data

US 2004/0137896 A1    Jul. 15, 2004

(51) Int. Cl.
*H04L 1/18*        (2006.01)
(52) U.S. Cl. ..................................................... 714/749
(58) Field of Classification Search ................ 714/748, 714/749, 746, 18; 455/517, 522; 370/441, 370/262; 375/130, 141
See application file for complete search history.

(56) References Cited

U.S. PATENT DOCUMENTS

| | | | |
|---|---|---|---|
| 6,101,168 A | 8/2000 | Chen et al. ................. | 370/228 |
| 6,151,696 A | 11/2000 | Miller et al. ................ | 714/748 |
| 6,426,960 B2 | 7/2002 | Antonio | |
| 6,694,469 B1 * | 2/2004 | Jalali et al. ................. | 714/748 |
| 2001/0048694 A1 | 12/2001 | Banister ...................... | 370/537 |
| 2002/0018446 A1 | 2/2002 | Huh et al. ................... | 370/245 |
| 2002/0154610 A1 | 10/2002 | Tiedemann et al. | |
| 2002/0167907 A1 | 11/2002 | Sarkar et al. ................ | 370/252 |
| 2002/0168945 A1 | 11/2002 | Hwang et al. ................ | 455/69 |
| 2002/0176362 A1 * | 11/2002 | Yun et al. .................... | 370/236 |

FOREIGN PATENT DOCUMENTS

| | | |
|---|---|---|
| EP | 1168703 | 1/2002 |
| WO | 0180475 | 10/2001 |
| WO | 0223792 | 3/2002 |
| WO | 03007530 | 1/2003 |

* cited by examiner

*Primary Examiner*—Shelly Chase
(74) *Attorney, Agent, or Firm*—Philip R. Wadsworth; Thien T. Nguyen; Kent D. Baker

(57) ABSTRACT

An acknowledgement method in a wireless communication system. Initially, a reverse supplemental channel (R-SCH) frame is received at a base station. The base station then transmits an acknowledgement (ACK) signal if quality of the received R-SCH frame is indicated as being good. A negative acknowledgement (NAK) signal is transmitted only if the received data frame is indicated as being bad but has enough energy such that, if combined with energy from retransmission of the data frame, it would be sufficient to permit correct decoding of the data frame. If the best base station is known, the acknowledgement method may reverse the transmission of the acknowledgement signals for the best base station so that only NAK signal is sent. A positive acknowledgement is assumed in the absence of an acknowledgement. This is done to minimize the transmit power requirements.

45 Claims, 8 Drawing Sheets

OPERATION OF A FORWARD LINK ACKNOWLEDGEMENT CHANNEL FOR THE REVERSE LINK DATA

BACKGROUND

1. Field

The disclosed embodiments relate generally to the field of communications, and more specifically to methods and apparatus for operation of a forward link acknowledgement channel.

2. Background

The field of communications has many applications including, e.g., paging, wireless local loops (WLL), Internet telephony, and satellite communication systems. An exemplary application is a cellular telephone system for mobile subscribers. Modern communication systems designed to allow multiple users to access a common communications medium have been developed for such cellular systems. These communication systems may be based on code division multiple access (CDMA), time division multiple access (TDMA), frequency division multiple access (FDMA), or other multiple access techniques known in the art. These multiple access techniques decode and demodulate signals received from multiple users, thereby enabling simultaneous communication among multiple users and allowing for a relatively large capacity for the communication systems.

In the CDMA system, the available spectrum is shared efficiently among a number of users, and techniques such as soft handoff are employed to maintain sufficient quality to support delay-sensitive services (such as voice) without wasting a lot of power. More recently, systems that enhance the capacity for data services have also been available. These systems provide data services by using higher order modulation, faster power control, faster scheduling, and more efficient scheduling for services that have more relaxed delay requirements. An example of such a data-services communication system is the high data rate (HDR) system that conforms to the Telecommunications Industry Association/Electronic Industries Alliance (TIA/EIA) cdma2000 High Data Rate Air Interface Specification IS-856, January 2002 (the IS-856 standard).

In a CDMA system, data transmission occurs from a source device to a destination device. The destination device receives the data transmission, demodulates the signal, and decodes the data. As part of the decoding process, the destination device performs the Cyclic Redundancy Code (CRC) check of the data packet to determine whether the packet was correctly received. Error detection methods other than the use of CRC, e.g., energy detection, can also be used in combination with or instead of CRC. If the packet was received with an error, the destination device transmits a negative acknowledgement (NAK) message on its acknowledgement (ACK) channel to the source device, which responds to the NAK message by retransmitting the packet that was received with an error.

Transmission errors may be particularly acute in applications with a low signal quality (e.g., low bit energy-to-noise power spectral density ratio ($E_b/N_o$)). In this situation, a conventional data retransmission scheme, such as Automatic Repeat Request (ARQ), may not meet (or may be designed not to meet) the maximum bit error rate (BER) required for the system operation. In such a case, combining the ARQ scheme with an error correction scheme, such as a Forward Error Correction (FEC), is often employed to enhance performance. This combination of ARQ and FEC is generally known as Hybrid ARQ (H-ARQ).

After transmitting a NAK, the destination device receives the data transmission and retransmission, demodulates the signal, and separates the received data into the new packet and the retransmitted packet. The new packet and the retransmitted packet need not be transmitted simultaneously. The destination device accumulates the energy of the received retransmitted packet with the energy already accumulated by the destination device for the packet received with an error. The destination device then attempts to decode the accumulated data packet. However, if the packet frame is initially transmitted with insufficient energy to permit correct decoding by the destination device, as described above, and is then retransmitted, the retransmission provides time diversity. As a result, the total transmit energy of the frame (including retransmissions) is lower on average. The combined symbol energy for both the initial transmission and retransmission(s) of the frame is lower than the energy that would have been required to transmit the frame initially at full power (i.e., at a power level that was sufficient on its own to permit correct decoding by the destination device) on average. Thus, the accumulation of the additional energy provided by the subsequent retransmissions improves the probability of a correct decoding. Alternately, the destination device might be able to decode the retransmitted packet by itself without combining the two packets. In both cases, the throughput rate can be improved since the packet received in error is retransmitted concurrently with the transmission of the new data packet. Again, it should be noted that the new packet and the retransmitted packet need not be transmitted simultaneously.

In the reverse link (i.e., the communication link from the remote terminal to the base station), the reverse supplemental channel (R-SCH) is used to transmit user information (e.g., packet data) from a remote terminal to the base station, and to support retransmission at the physical layer. The R-SCH may utilize different coding schemes for the retransmission. For example, a retransmission may use a code rate of ½ for the original transmission. The same rate ½ code symbols may be repeated for the retransmission. In an alternative case, the underlying code may be a rate ¼ code. The original transmission may use ½ of the symbols and the retransmission may use the other half of the symbols. An example of the reverse link architecture is described in detail in U.S. patent application No. 2002/0154610, entitled "REVERSE LINK CHANNEL ARCHITECTURE FOR A WIRELESS COMMUNICATION SYSTEM" assigned to the assignee of the present application.

In a CDMA communication system, and specifically in a system adapted for packetized transmissions, congestion and overloading may reduce the throughput of the system. The congestion is a measure of the amount of pending and active traffic with respect to the rated capacity of the system. System overload occurs when the pending and active traffic exceeds the rated capacity. A system may implement a target congestion level to maintain traffic conditions without interruption, i.e., to avoid overloading and underloading of resources.

One problem with overloading is the occurrence of delayed transmission responses. An increase in response time often leads to application level timeouts, wherein an application requiring the data waits longer than the application is programmed to allow, producing a timeout condition. Applications will then needlessly resend messages on timeouts, causing further congestion. If this condition continues, the system might reach a condition where it can service no users. One solution (used in HDR) for this condition is congestion control. Another solution (used in cdma2000) is proper scheduling.

The level of congestion in a system may be determined by monitoring the data rates of pending and active users, and the received signal strength required to achieve a desired quality of service. In a wireless CDMA system, the reverse link capacity is interference-limited. One measure of the cell congestion is the total amount of noise over the level of the thermal noise at a base station (referred to hereafter as the "rise over thermal" (ROT)). The ROT corresponds to the reverse link loading. A loaded system attempts to maintain the ROT near a predetermined value. If the ROT is too high, the range of the cell (i.e., the distance over which the base station of the cell can communicate) is reduced and the reverse link is less stable. The range of the cell is reduced because of an increase in the amount of transmit energy required to provide a target energy level. A high ROT also causes small changes in instantaneous loading that result in large excursions in the output power of the remote terminal. A low ROT can indicate that the reverse link is not heavily loaded, thus indicating that available capacity is potentially being wasted.

However, operating the R-SCH with H-ARQ may require that the initial transmission of an R-SCH frame not be power controlled very tightly to meet the ROT constraints. Therefore, the delivered signal-to-noise ratio (SNR) on the initial transmission of an R-SCH frame can be below the level sufficient to permit correct decoding of the received data packet. This condition can result in a NAK message being transmitted over the forward link ACK channel.

Accordingly, from the discussion above, it should be apparent that there is a need in the art for an apparatus and method that enables efficient operation of the forward link ACK channel.

SUMMARY

Embodiments disclosed herein address the need for an apparatus and method that enables efficient operation of the forward link ACK channel in conjunction with a packet data channel in a wireless communications system.

In one aspect, an acknowledgement method and apparatus of wireless communication includes receiving a reverse supplemental channel (R-SCH) frame at a base station. The base station then transmits an acknowledgement (ACK) signal if quality of the received R-SCH frame is indicated as being good. A negative acknowledgement (NAK) signal is transmitted only if the received data frame is indicated as being bad but has enough energy such that, if combined with energy from retransmission of the data frame, it would be sufficient to permit correct decoding of the data frame In another aspect, an acknowledgement method and apparatus of wireless communication includes transmitting a reverse supplemental channel (R-SCH) frame from a remote terminal to a base station. The base station then transmits a negative acknowledgement (NAK) signal to the remote terminal if quality of the received R-SCH frame is indicated as being bad. The remote terminal also recognizes that an absence of a received acknowledgement indicates an acknowledgement (ACK) signal such that the quality of the received R-SCH frame is good, which indicates a condition where energy of the R-SCH frame is sufficient to permit correct decoding of the frame. The base station in this aspect is the best base station that provides smallest path loss to the remote terminal.

In another aspect, an acknowledgement channel for a wireless communication system includes a block encoder, a mapper, and a mixer. The block encoder receives an ACK/NAK message having at least one bit, and operates to encode the ACK/NAK message with a generator matrix to produce a codeword. The mapper maps the codeword into a binary signal. The mixer mixes the binary signal with an orthogonal spreading code such as a Walsh code to produce an encoded ACK/NAK signal.

Other features and advantages of the present invention should be apparent from the following descriptions of the exemplary embodiments, which illustrates, by way of example, the principles of the invention.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In recognition of the above-stated need for an apparatus and method that enables efficient operation of the forward link ACK channel, this disclosure describes exemplary embodiments for efficiently allocating and utilizing the reverse link resources. In particular, a reliable acknowledgment scheme and an efficient retransmission scheme, which can improve the utilization of the reverse link and allow data frames to be transmitted at lower transmit power, are described in detail below.

Although various aspects of the present invention will be described in the context of a CDMA communications system, those skilled in the art will appreciate that the techniques for providing efficient operation of the forward link ACK channel described herein are likewise suitable for use in various other communications environments including communications systems based on TDMA, FDMA, SDMA, PDMA, and other multiple access techniques known in the art, and communications systems based on AMPS, GSM, HDR, and various CDMA standards, and other communication standards known in the art. Accordingly, any reference to a CDMA communications system is intended only to illustrate the inventive aspects of the present invention, with the understanding that such inventive aspects have a wide range of applications.

Figure 1:
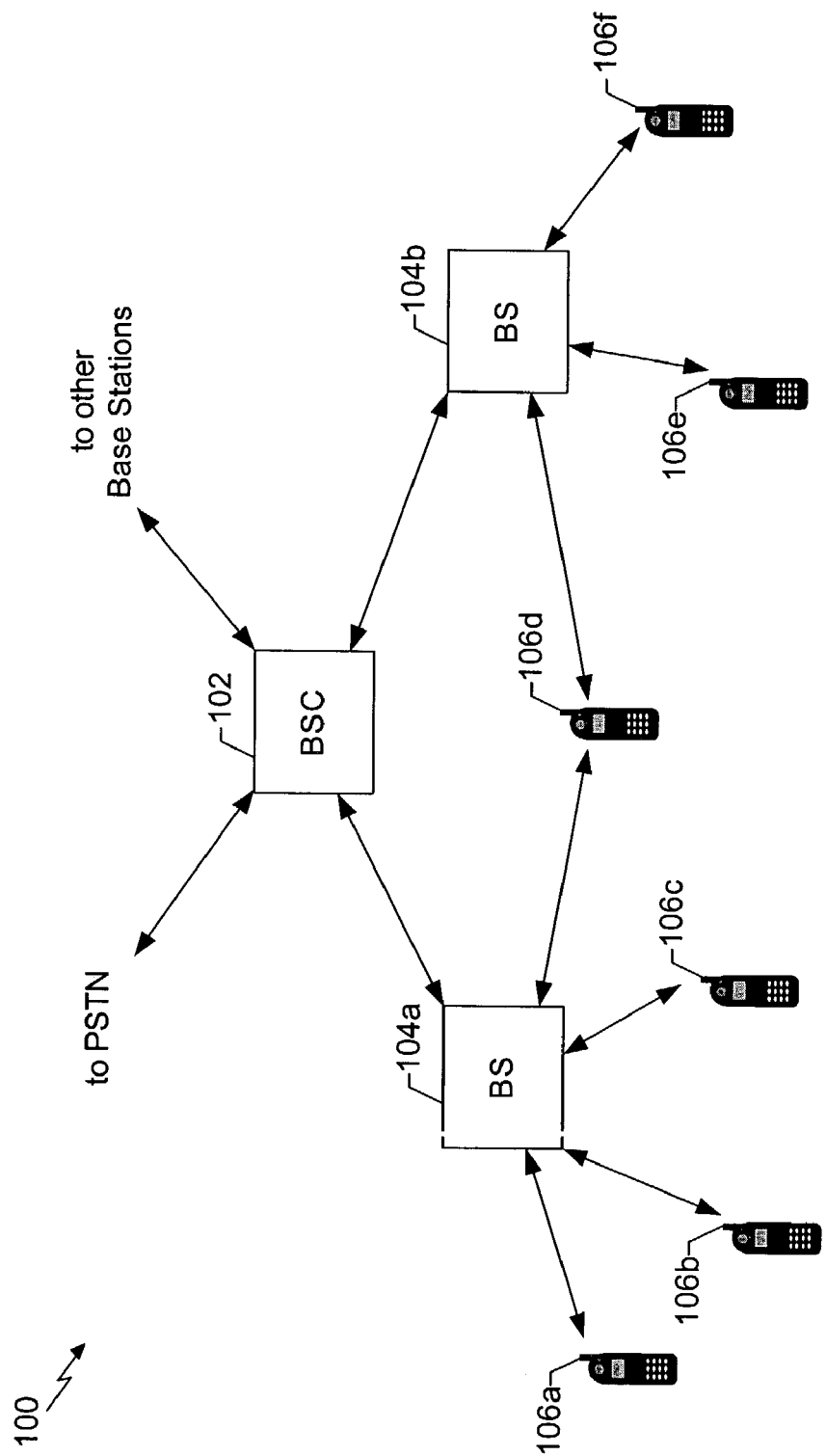
FIG. 1 is a diagram of an exemplary wireless communication system that supports a number of users and is capable of implementing various aspects of the invention.

FIG. 1 is a diagram of an exemplary wireless communication system 100 that supports a number of users and capable of implementing various aspects of the invention. The communication system 100 provides communication for a number of cells, with each cell being serviced by a corresponding base station (BS) 104. Various remote terminals 106 are dispersed throughout the system 100. Individual base stations or remote terminals will be identified by a letter suffix such as 104a or 106c. References to 104 or 106 without a letter suffix will be understood to refer to the base stations and remote terminals in the general sense.

Each remote terminal 106 may communicate with one or more base stations 104 on the forward and reverse links at any particular moment, depending on whether or not the remote terminal is active and whether or not it is in soft handoff. The forward link refers to transmission from a base station 104 to a remote terminal 106, and the reverse link refers to transmission from a remote terminal 106 to a base station 104. As shown in FIG. 1, the base station 104a communicates with the remote terminals 106a, 106b, 106c, and 106d, and the base station 104b communicates with the remote terminals 106d, 106e, and 106f. The remote terminal 106d is in a soft handoff condition and concurrently communicates with both of the base stations 104a and 104b.

In the wireless communication system 100, a base station controller (BSC) 102 communicates with the base stations 104 and may further communicate with a public switched telephone network (PSTN). The communication with the PSTN is typically achieved via a mobile switching center (MSC), which is not shown in FIG. 1 for simplicity. The BSC may also communicate with a packet network, which is typically achieved via a packet data serving node (PDSN) that is also not shown in FIG. 1. The BSC 102 provides coordination and control for the base stations 104. The BSC 102 further controls the routing of telephone calls among the remote terminals 106, and between the remote terminals 106 and users communicating with the PSTN (e.g., conventional telephones) and to the packet network, via the base stations 104.

Figure 2:
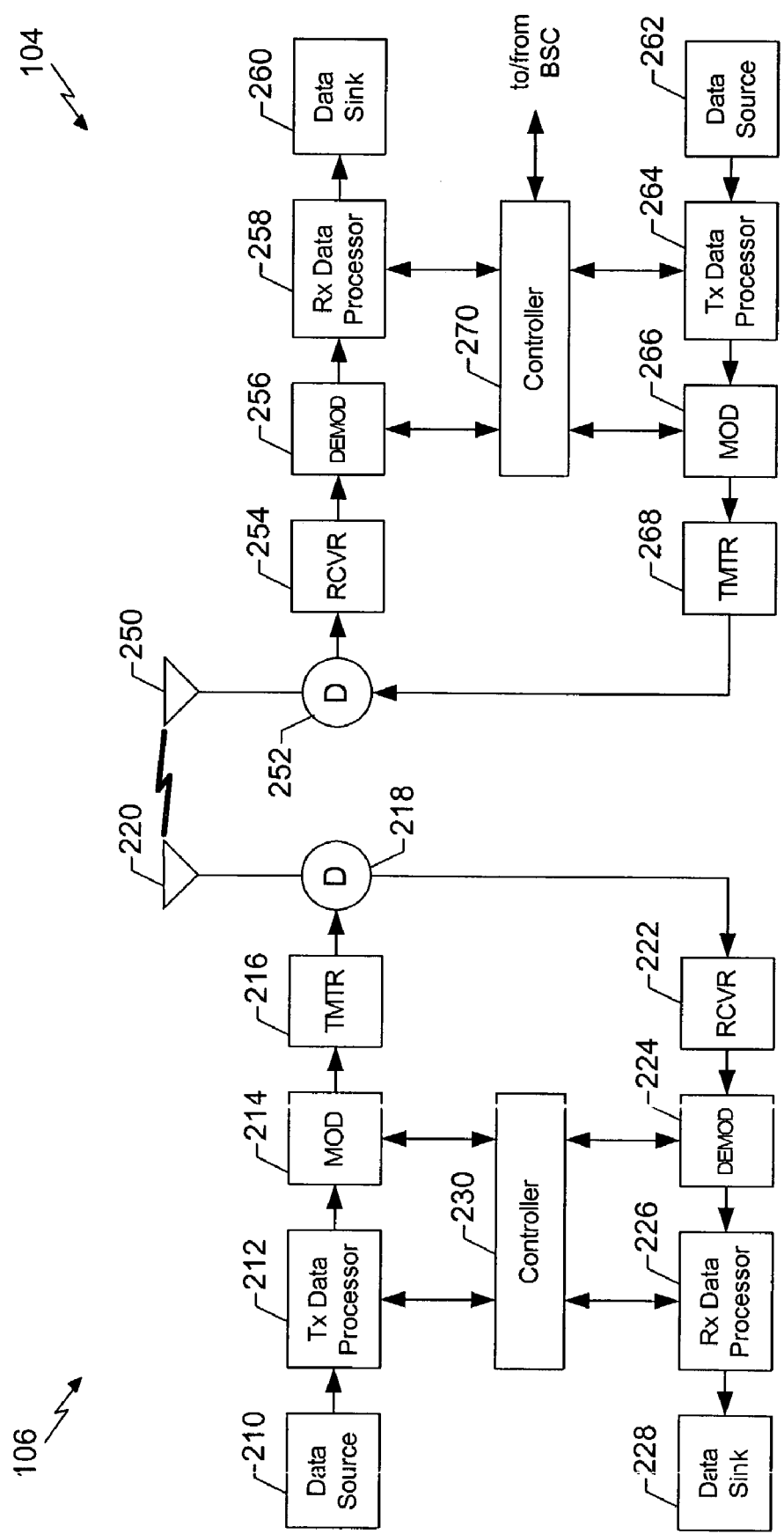
FIG. 2 is a simplified block diagram of an embodiment of a base station and a remote terminal of the FIG. 1 communication system.

FIG. 2 is a simplified block diagram of an embodiment of a base station 104 and a remote terminal 106, which are capable of implementing various aspects of the invention. For a particular communication, voice data, packet data, and/or messages may be exchanged between the base station 104 and the remote terminal 106. Various types of messages may be transmitted such as messages used to establish a communication session between the base station and the remote terminal and messages used to control a data transmission (e.g., power control, data rate information, acknowledgment, and so on). Some of these message types are described below. In particular, the implementation of the reverse link data acknowledgement using the forward link ACK channel is described in detail.

For the reverse link, at the remote terminal 106, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, Turbo, block, and other coding, or no coding at all. Typically, voice data, packet data, and messages are coded using different schemes, and different types of message may also be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to the base station 104.

At the base station 104, the reverse link signal is received by an antenna 250, routed through a duplexer 252, and provided to a receiver unit (RCVR) 254. The receiver unit 254 conditions (e.g., filters, amplifies, downconverts, and digitizes) the received signal and provides samples. A demodulator (DEMOD) 256 receives and processes (e.g., despreads, decovers, and pilot demodulates) the samples to provide recovered symbols. The demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by the demodulator 256 and the RX data processor 258 are complementary to that performed at the remote terminal 106. The demodulator 256 and the RX data processor 258 may further be operated to process multiple transmissions received via multiple channels, e.g., a reverse fundamental channel (R-FCH) and a reverse supplemental channel (R-SCH). Also, transmissions may be received simultaneously from multiple remote terminals, each of which may be transmitting on a reverse fundamental channel, a reverse supplemental channel, or both.

On the forward link, at the base station 104, voice and/or packet data (e.g., from a data source 262) and messages (e.g., from the controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through the duplexer 252 and transmitted via the antenna 250 to the remote terminal 106.

At the remote terminal 106, the forward link signal is received by the antenna 220, routed through the duplexer 218, and provided to a receiver unit 222. The receiver unit 222 conditions (e.g., downconverts, filters, amplifies, quadrature demodulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to the controller 230.

The reverse link has some characteristics that are very different from those of the forward link. In particular, the data transmission characteristics, soft handoff behaviors, and fading phenomenon are typically very different between the forward and reverse links. For example, the base station typically does not know a priori which remote terminals have packet data to transmit, or how much data to transmit. Thus, the base station may allocate resources to the remote terminals whenever requested and as available. Because of a uncertainty in user demands, the usage on the reverse link may fluctuate widely.

Apparatus and methods are provided to efficiently allocate and utilize the reverse link resources in accordance with exemplary embodiments of the invention. The reverse link resources may be assigned via a supplemental channel (e.g., R-SCH) that is used for packet data transmission. In particular, a reliable acknowledgment scheme and an efficient retransmission scheme are provided.

A reliable acknowledgment scheme and an efficient retransmission scheme should consider several factors that control communication between base stations and a remote terminal. One of the factors to consider include the fact that the base stations with path losses that are about a few dB larger than a base station with the smallest path loss to the remote terminal (e.g., the base station that is closest to the remote terminal), but are in the Active Set of the remote terminal, have relatively little chance of correctly receiving reverse supplemental channel (R-SCH) frames.

In order for the soft handoff to work and the overall remote terminal transmit power to be reduced, the remote terminal needs to receive indications for these missed or bad R-SCH frames. Since the remote terminal is going to receive significantly more negative acknowledgements than positive acknowledgements, an exemplary acknowledgement scheme is configured (see FIG. 3) so that the base station (BS) sends a remote terminal (RT) an acknowledgement (ACK) for a good frame and a negative acknowledgement (NAK) for a bad frame only if the received bad R-SCH frame has enough energy such that, if combined with energy from the retransmission of the R-SCH frame, it would be sufficient to permit correct decoding of the frame by the base station. The bad frames having insufficient energy (even when combined with retransmission energy) to permit correct decoding of the frame by the base station, will not receive a NAK signal. Thus, when the remote terminal does not receive an ACK or NAK signal, the remote terminal will assume that the bad frame received at the base station did not have sufficient energy to permit correct decoding of the frame. In this case, the remote terminal will need to retransmit the frame with a default transmission level sufficient to permit correct decoding. In one embodiment, this default transmission level may be predetermined to enable correct decoding by the base station. In another embodiment, this default transmission level may be dynamically determined in accordance with a transmission condition of the wireless CDMA system.

Figure 3:
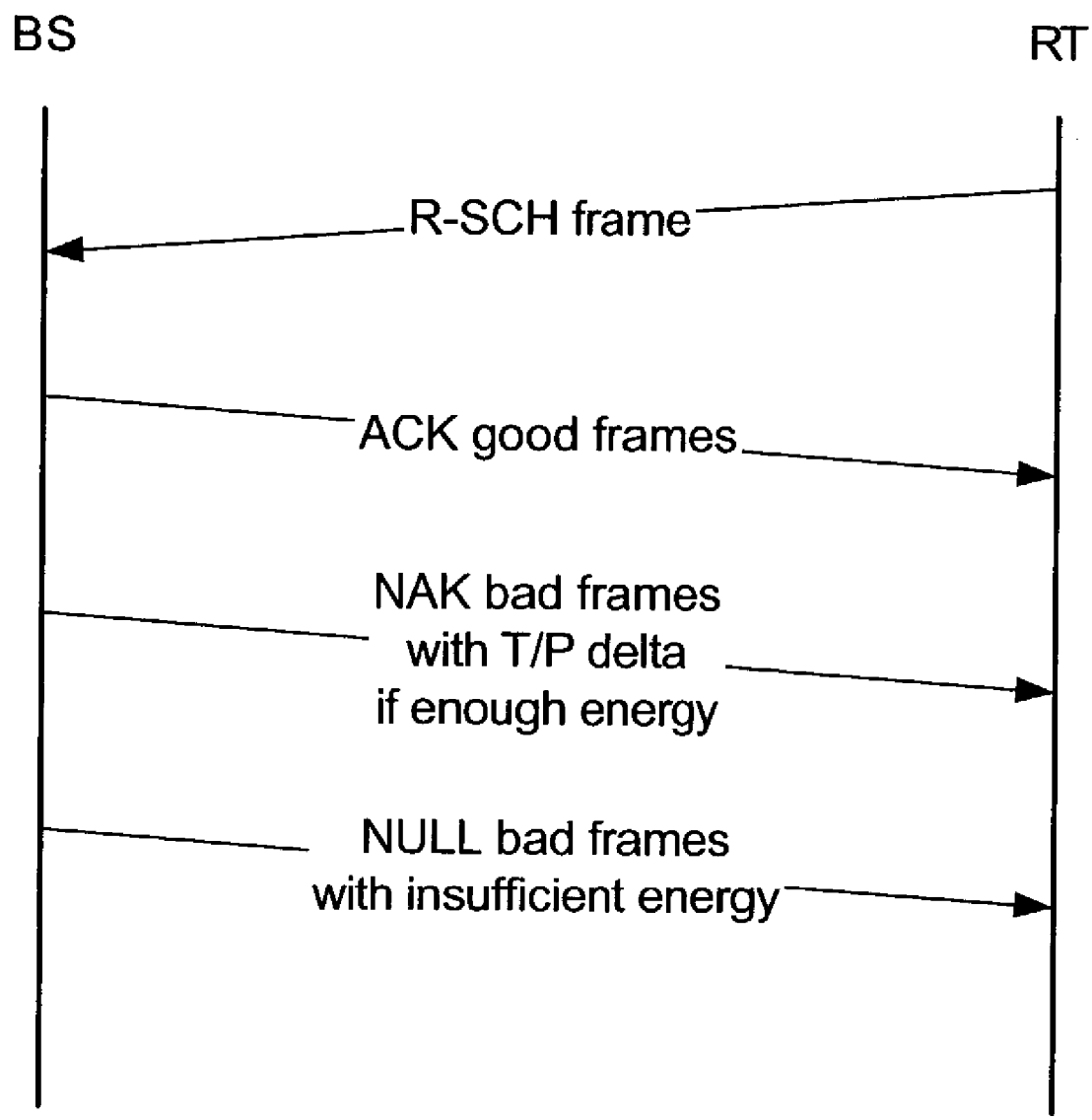
FIG. 3 illustrates an exemplary forward link ACK channel according to the acknowledgement scheme discussed herein.

FIG. 3 illustrates an exemplary forward link ACK channel according to the acknowledgement scheme discussed above. In the illustrated embodiment, the remote terminal sends an R-SCH frame to the base station(s). The base station receives the R-SCH frame and sends an ACK signal if the received R-SCH frame is recognized as being a "good" frame.

In one embodiment, the recognition of the quality of the received R-SCH frame (i.e., as being "good" or "bad") can be made by observing the reverse link pilot signal, or, equivalently, based on the power control bits sent from the remote terminal. Therefore, if the reverse link pilot signal includes sufficient energy to permit correct decoding of the frame by the base station, the frame is considered to be "good". Otherwise, if the reverse link pilot signal includes insufficient energy to permit correct decoding of the frame by the base station, the frame is considered to be "bad".

The exemplary forward link ACK channel of the base station sends a NAK signal with a traffic-to-pilot ratio (T/P) delta if the received R-SCH frame is recognized as being a "bad" frame but has enough energy to combine with retransmission. This condition occurs when the received bad R-SCH frame has enough energy such that if combined with energy from the retransmission of the R-SCH frame, it would be sufficient to permit correct decoding of the frame by the base station.

The traffic-to-pilot ratio (T/P) can be computed by measuring the ratio between the energy level of the reverse traffic channel (e.g., the R-SCH) and the reverse pilot channel. Thus, in this embodiment, this ratio is used for power control of the R-SCH and is compared to the total energy level sufficient to permit correct decoding of the R-SCH frame by the base station. The difference between the T/P value of the initial transmission and the total energy level sufficient to permit correct decoding of the R-SCH frame provides a parameter referred to as a T/P delta. In general, the total energy level is the energy level required to maintain a certain quality of service (QoS), which depends on speed, channel condition, and other parameters related to QoS. Accordingly, the T/P delta provides a differential energy value that must be delivered by the remote terminal on the retransmission to compensate for the energy deficit on the initial transmission, and allow the base station to correctly decode the R-SCH frame on the reverse link. The calculated T/P delta can be transmitted to the remote terminal on the forward ACK channel along with acknowledgement signals. In case where there are two or more base stations in the Active Set of the remote terminal, and both base stations send NAK signals with different T/P deltas in response to bad R-SCH frames, the remote terminal should choose the one with the lower T/P delta so that at least one base station is allowed to correctly decode the packet.

Further, the base station will not send a NAK signal (i.e., NULL data) when the received bad R-SCH frame, combined with retransmission energy, has insufficient energy to permit correct decoding of the frame by the base station. The remote terminal should recognize this "NULL" condition as a signal from the base station to the remote terminal to retransmit the R-SCH frame with a default transmission level sufficient to permit correct decoding.

The acknowledgement scheme illustrated in FIG. 3 can be further optimized if the remote terminal can detect or determine which base station has the smallest path loss to the remote terminal (i.e., the best base station). In one embodiment, a pattern of power control commands from the base station to the remote terminal is used to determine which base station is the best base station. For example, the base station can measure the energy deficit of the actually received frame relative to the power control target (as is done in the closed-loop power control) to determine which base station is the best base station. By averaging the energy deficit over many frames, the base station can determine whether it is the best base station or not. This information can be transmitted to the remote terminal. For another example, the base station can measure the pattern of power control up/down bits to determine which is the best base station In an alternative embodiment, the best base station can be readily determined if the remote terminal is operating in a data/voice (DV) mode of a 1xEv-DV system. In this mode, both the base station and the remote terminal need to know which base station is the best base station. Thus, the remote terminal uses the reverse channel quality indicator channel (R-CQICH) to indicate to the base station the channel quality measurements of the best base station.

However, using either embodiment described above, there may still be a period of time when the two sides (the base station and the remote terminal) are not necessarily synchronized about which base station is the best base station. Accordingly, in one embodiment, during the period when there is a conflict between the two sides, the base station that is designated and undesignated as being the best base station is configured to send both ACK (when the frame is good) and NAK (when the frame is bad) signals so that the remote terminal will not get confused.

Figure 4:
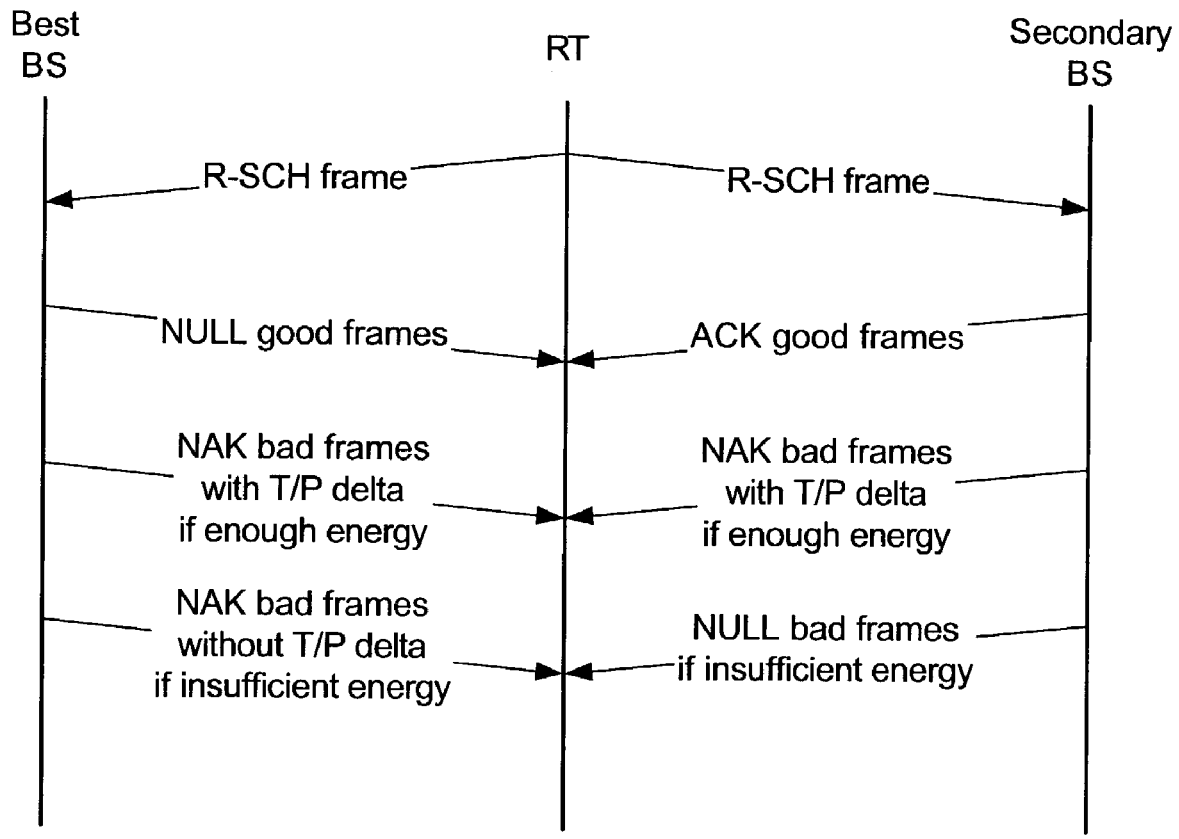
FIG. 4 illustrates an exemplary forward link ACK channel operating in accordance with an assumption that the remote terminal recognizes which base station is the best base station.

FIG. 4 illustrates an exemplary forward link ACK channel operating in accordance with an assumption that the remote terminal recognizes which base station is the best base station. Hence, in the illustrated embodiment, the remote terminal sends R-SCH frames to the best base station and the secondary base station(s). Since the best base station will be receiving a lot more "good" frames than "bad" frames, the acknowledgement scheme from the best base station is biased toward not sending ACK signals for "good" frames but sending NAK signals for "bad" frames. The secondary base station will be biased in reverse since it will be receiving a lot more "bad" frames than "good" frames. Thus, the acknowledgement scheme from the secondary base station is biased toward sending ACK signals for "good" frames but not sending NAK signals for "bad" frames.

Accordingly, in response to the receipt of the R-SCH frame from the remote terminal, the exemplary forward link ACK channel of the best base station does not send an ACK signal (i.e., NULL data) if the received R-SCH frame is recognized as being a "good" frame. The remote terminal should recognize this "NULL" condition as a signal from the best base station that the transmitted R-SCH frame was received with sufficient energy to permit correct decoding and that there is no need for retransmission of the frame. If the received R-SCH frame is recognized as being a "bad" frame but has enough energy to combine with retransmission, the best base station sends a NAK signal with a T/P delta. This condition occurs when the received bad R-SCH frame has enough energy such that if combined with energy from the retransmission of the R-SCH frame, it would be sufficient to permit correct decoding of the frame by the best base station. The best base station sends a NAK signal without a T/P delta if the received bad R-SCH frame, combined with retransmission energy, has insufficient energy to permit correct decoding of the frame by the best base station. Thus, the remote terminal retransmits the R-SCH frame with a default transmission level sufficient to permit correct decoding.

However, the exemplary forward link ACK channel of the secondary base station, in response to the receipt of the R-SCH frame from the remote terminal, sends an ACK signal if the received R-SCH frame is recognized as being a "good" frame. If the received R-SCH frame is recognized as being a "bad" frame but has enough energy to combine with retransmission, the secondary base station sends a NAK signal with a T/P delta. This condition occurs when the received bad R-SCH frame has enough energy such that if combined with energy from the retransmission of the R-SCH frame, it would be sufficient to permit correct decoding of the frame by the secondary base station. The secondary base station does not send a NAK signal (i.e., NULL data) when the received bad R-SCH frame, combined with retransmission energy, has insufficient energy to permit correct decoding of the frame by the base station. The remote terminal should recognize this "NULL" condition as a signal from the secondary base station to the remote terminal to retransmit the R-SCH frame with a default transmission level sufficient to permit correct decoding.

Figure 5A:
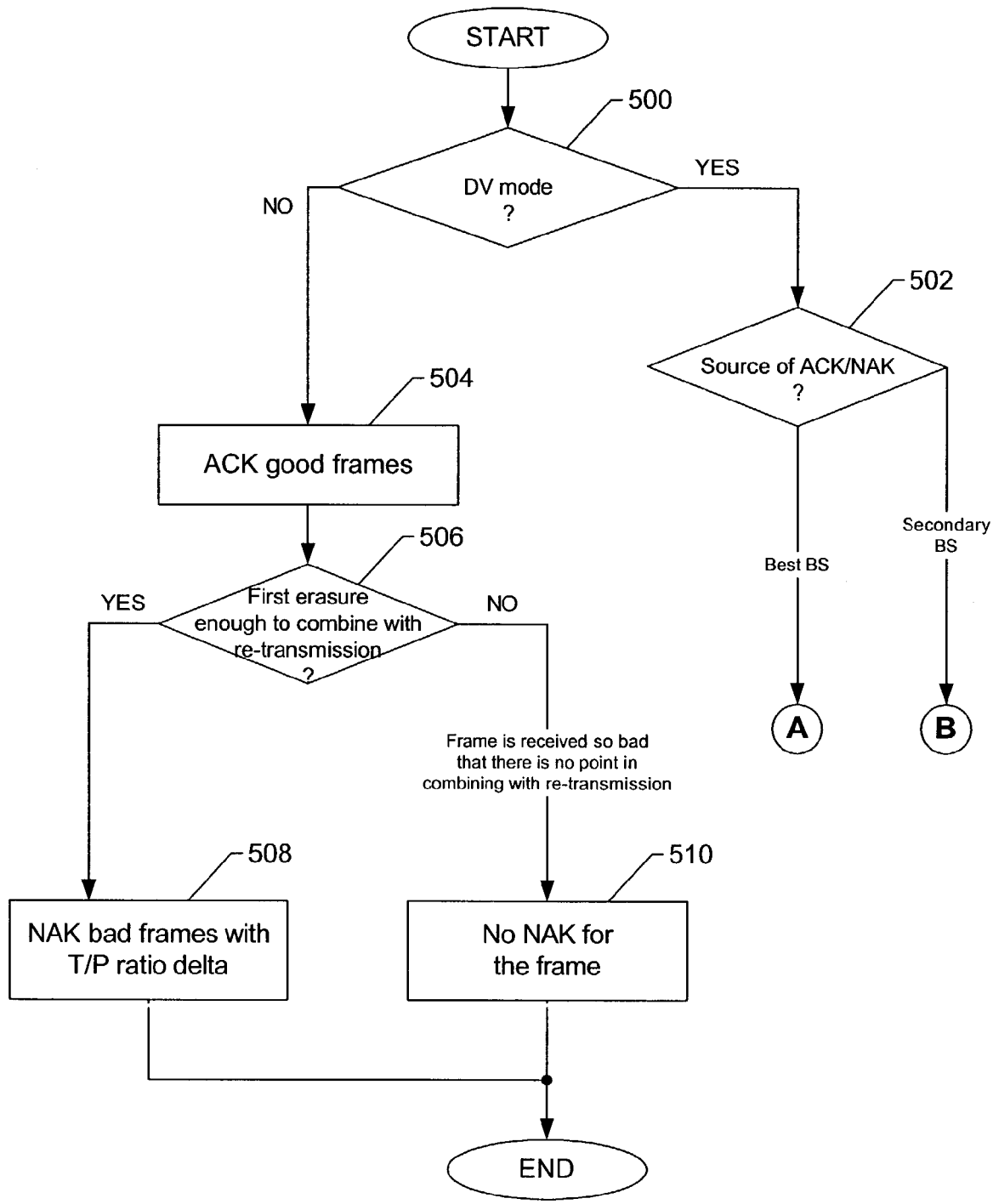
FIGS. 5A through 5C illustrate a flowchart of an exemplary method for implementing an acknowledgement scheme operating on a forward link ACK channel.
Figure 5B:
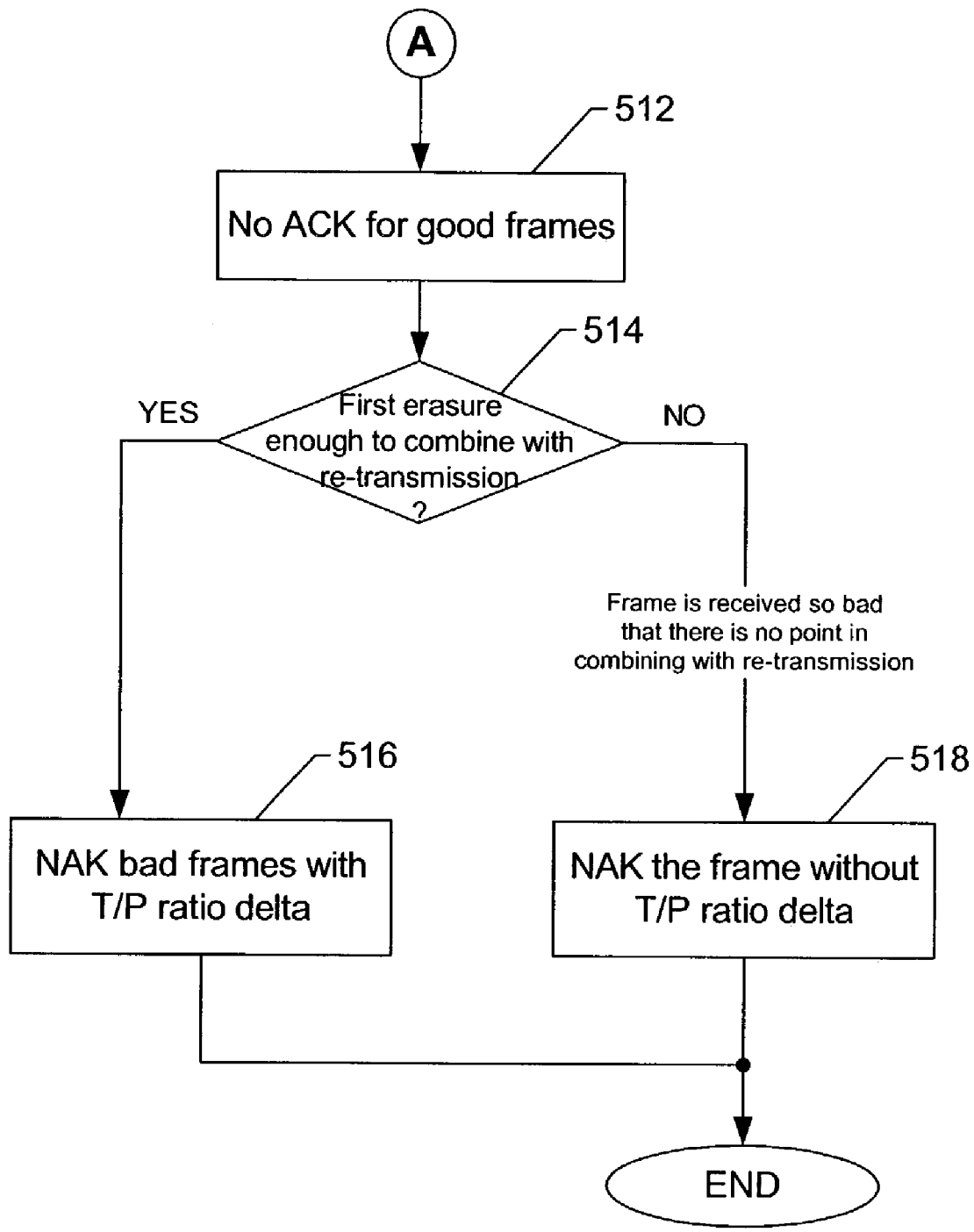
Figure 5C:
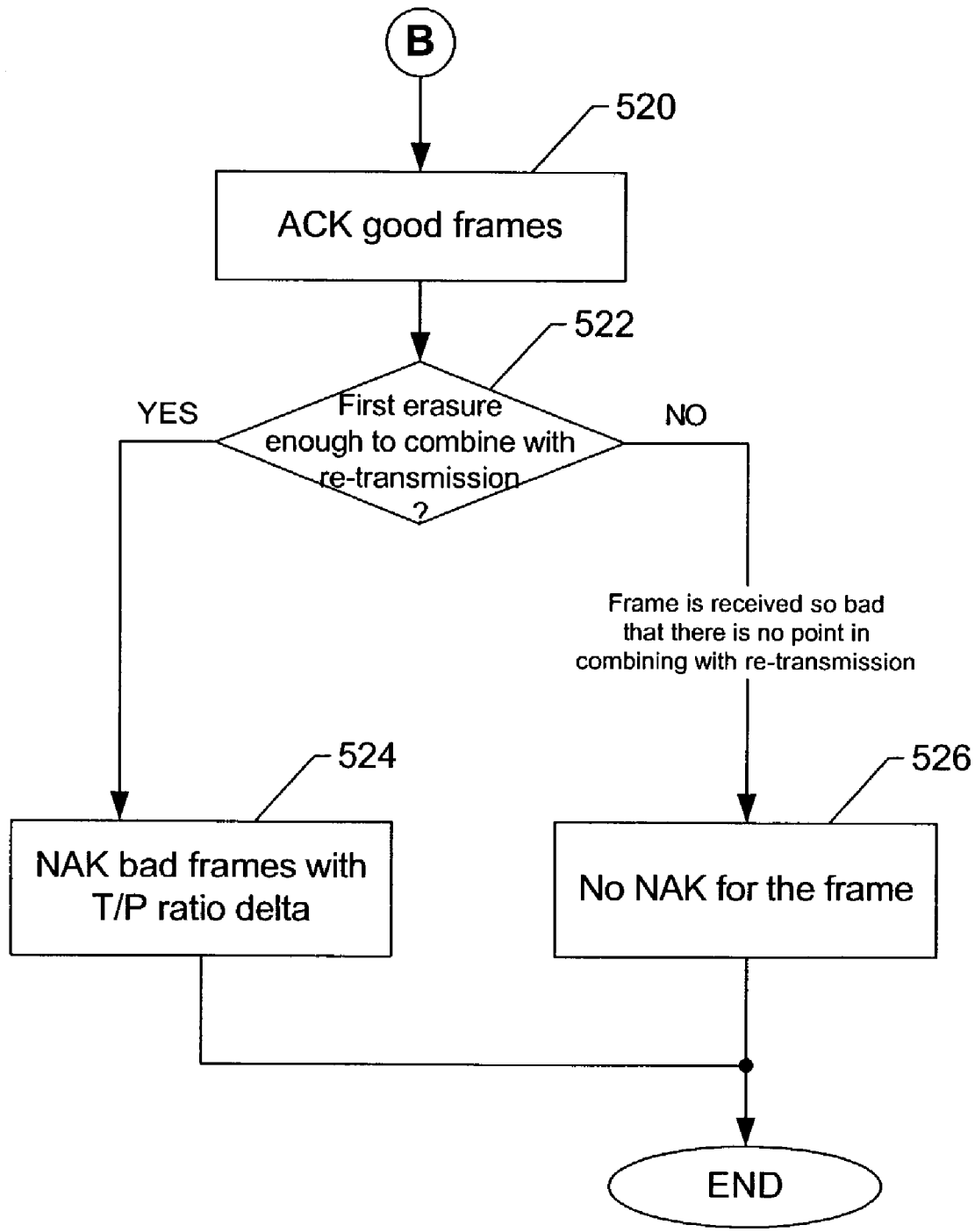

An exemplary method for implementing an above-described acknowledgement scheme operating on a forward link ACK channel is illustrated in a flowchart shown in FIG. 5A through FIG. 5C. At box 500, a determination is made as to whether the remote terminal under a condition where the terminal has knowledge about which base station has the smallest path loss to the remote terminal (i.e., the best base station). As described above, this can be determined by measuring the energy deficit of the actually received frame relative to the power control target. By averaging the energy deficit over a sufficient number of frames, the base station can determine whether it is the best base station or not. This information can be transmitted to the remote terminal. If the remote terminal is operating in a data/voice (DV) mode of a 1xEv-DV system, both the base station and the remote terminal must know which base station is the best base station. Thus, in the DV mode, there is no need to determine which base station is the best base station.

If the remote terminal cannot determine which base station is the best base station at box 500, a "No" outcome, then a base station that received the R-SCH frame sends an ACK signal (at box 504) if the received R-SCH frame is recognized as being a "good" frame. The recognition of the quality of the received R-SCH frame (i.e., as being "good" or "bad") can be made according to the process described above.

At box 506, a determination is made whether the received bad R-SCH frame has enough energy such that if combined with energy from the retransmission of the R-SCH frame, it would be sufficient to permit correct decoding of the frame by the base station. If this is the case, the exemplary forward link ACK channel of the base station sends a NAK signal with a T/P delta, at box 508. Otherwise, the base station will not send a NAK signal (i.e., NULL data) for the bad R-SCH frame, at box 510. The remote terminal should recognize this "NULL" condition as a signal from the base station to the remote terminal to retransmit the R-SCH frame with a default transmission level sufficient to permit correct decoding.

If the remote terminal is able to determine which base station is the best base station at box 500, a "Yes" outcome at box 500, then the source of an ACK/NAK signal is determined, at 502, as being either the "best" base station or a "secondary" base station. If the source is the "best" base station, then the exemplary forward link ACK channel of the best base station does not send an ACK signal (i.e., NULL data) in response to a "good" frame, at box 512. The remote terminal will recognize this "NULL" condition as a signal from the best base station that the transmitted R-SCH frame was received with sufficient energy to permit correct decoding and that there is no need for retransmission of the frame.

At box 514, a determination is made whether the received bad R-SCH frame has sufficient energy such that if combined with energy from the retransmission of the R-SCH frame, correct decoding of the frame by the base station could be performed. If this is the case, the exemplary forward link ACK channel of the best base station sends a NAK signal with a T/P delta, at box 516. Otherwise, the best base station sends a NAK signal without a T/P delta, at 518. Thus, the remote terminal retransmits the R-SCH frame with a default transmission level sufficient to permit correct decoding.

If the source of an ACK/NAK signal is determined (at box 502) to be the secondary base station, then the exemplary forward link ACK channel of the secondary base station sends an ACK signal, at box 520, in response to a "good" frame. At box 522, a determination is again made as to whether the received bad R-SCH frame has enough energy such that if combined with energy from the retransmission of the R-SCH frame, it would be sufficient to permit correct decoding of the frame by the base station. If this is the case, the exemplary forward link ACK channel of the secondary base station sends a NAK signal with a T/P delta, at box 524. Otherwise, if the received bad R-SCH frame, combined with retransmission energy, has insufficient energy to permit correct decoding of the frame by the base station, then the secondary base station does not send a NAK signal (i.e., NULL data), at box 526. The remote terminal should recognize this "NULL" condition as a signal from the secondary base station to the remote terminal to retransmit the R-SCH frame with a default transmission level sufficient to permit correct decoding.

Figure 6:
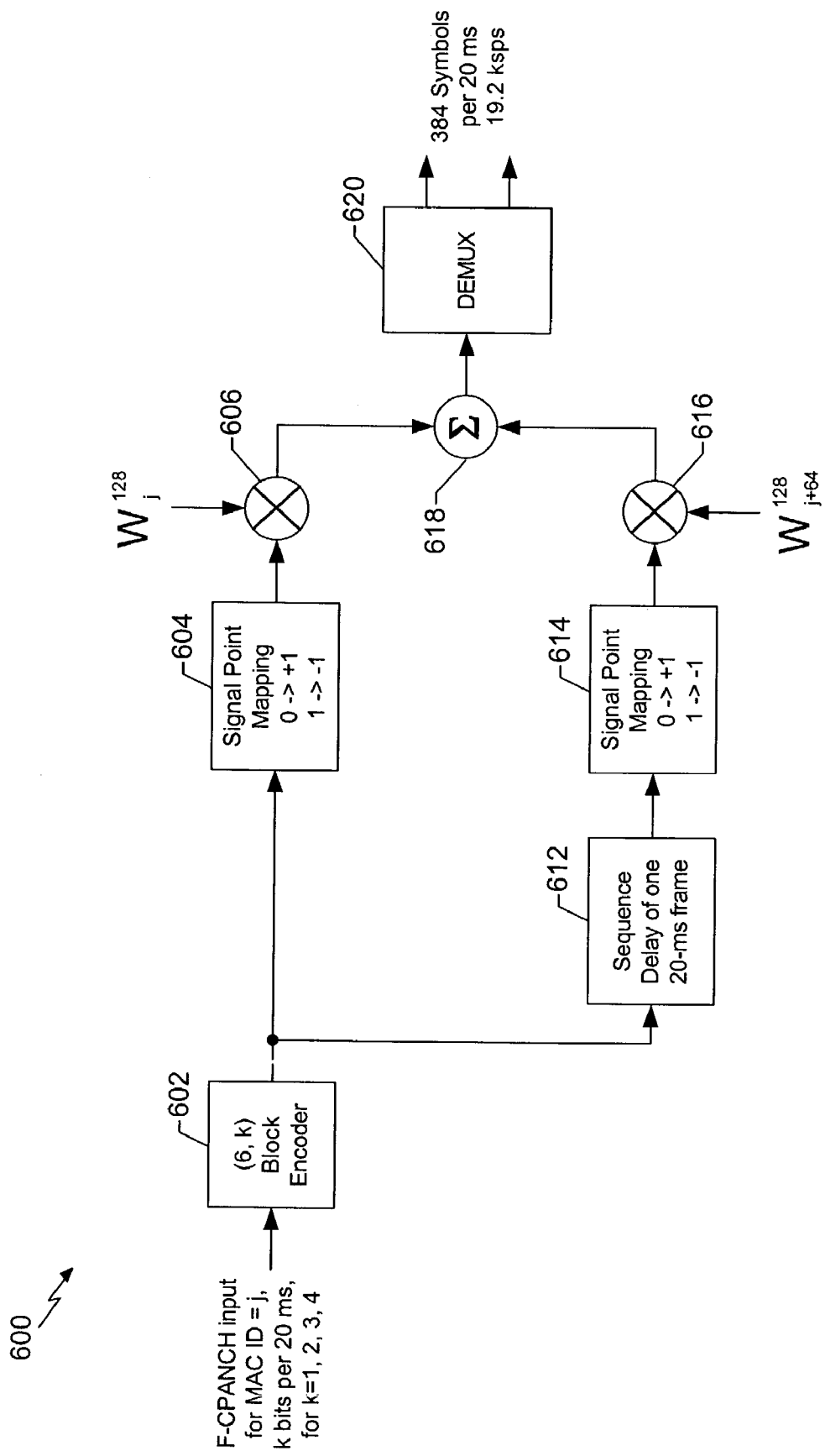
FIG. 6 is block diagram of an exemplary F-CPANCH.

As described above, acknowledgements (ACK) and negative acknowledgements (NAK) are transmitted by the base station for data transmission on the R-SCH. Moreover, the ACK/NAK can be transmitted using a Forward Common Packet Acknowledgement Channel (F-CPANCH). FIG. 6 is a block diagram of an exemplary F-CPANCH.

In one embodiment, ACK and NAK are transmitted as n-bit ACK/NAK messages, with each message being associated with a corresponding data frame transmitted on the reverse link. Thus, each ACK/NAK message may include 1, 2, 3, or 4 bits (or possible more bits), with the number of bits in the message being dependent on the number of reverse link channels in the service configuration. The n-bit ACK/NAK message may be block coded to increase reliability or transmitted in the clear. To improve reliability, the ACK/NAK message for a particular data frame can be retransmitted in a subsequent frame (e.g., 20 milliseconds later) to provide time diversity for the message. The time diversity provides additional reliability, or may allow for the reduction in power used to send the ACK/NAK message while maintaining the same reliability. The ACK/NAK message may use error correcting coding as is well known in the art. For the retransmission, the ACK/NAK message may repeat the exact same code word or may use incremental redundancy. The encoding approach is described in further detail below.

In the illustrated embodiment of FIG. 6, the F-CPANCH input for MAC ID=j, and k bits per 20 millisecond, where k=1, 2, 3, or 4, is provided to a (6, k) block encoder 602. In general, the (n, k) block codes are specified in terms of their generator matrices. The encoder output codeword, y=[y$_0$y$_1$ ... y$_{n-1}$], is equal to y=uG, where u=[u$_0$u$_1$ ... u$_{k-1}$] is the input sequence, u$_0$ is the first input bit, y$_0$ is the first output bit, and G is the k×n generator matrix.

The generator matrix for the (6,1), F-CPANCH code is

G=[1 1 1 1 1 1].

The generator matrix for the (6,2), F-CPANCH code is $$G = \begin{bmatrix} 1 & 1 & 1 & 1 & 0 & 0 \\ 0 & 0 & 1 & 1 & 1 & 1 \end{bmatrix}.$$

The generator matrix for the (6,3), F-CPANCH code is $$G = \begin{bmatrix} 1 & 0 & 1 & 1 & 0 & 0 \\ 0 & 1 & 0 & 1 & 1 & 0 \\ 0 & 0 & 1 & 0 & 1 & 1 \end{bmatrix}.$$

The generator matrix for the (6,4), F-CPANCH code is $$G = \begin{bmatrix} 1 & 1 & 1 & 0 & 0 & 0 \\ 0 & 1 & 1 & 1 & 0 & 0 \\ 0 & 0 & 1 & 1 & 1 & 0 \\ 0 & 0 & 0 & 1 & 1 & 1 \end{bmatrix}.$$

The output of the encoder 602 is then signal point mapped in a mapper 604 such that a 0 is a +1 and a 1 is a −1. The resulting signal is mixed by a mixer 606 with a Walsh code, such as a 128-ary Walsh code ($W^{128}$). The use of a Walsh code provides for channelization and for resistance to phase errors in the receiver. It should be noted that for other CDMA systems, other orthogonal or quasi-orthogonal functions could be substituted for Walsh code functions (e.g., OVSF for WCDMA).

To improve reliability, the ACK/NAK message for a particular data frame can be retransmitted in a subsequent frame (e.g., 20 milliseconds later) to provide time diversity for the message. The retransmission is implemented by inserting a block 612, which provides a sequence delay of one 20-millisecond frame, and a mapper 614 (substantially similar to the mapper 604) and a mixer 616 (substantially similar to the mixer 606). However, the mixer 616 is mixed with a Walsh code starting at 65 and ending at 128.

The outputs of the mixers 606 and 616 are combined by a summing element 618. The output of the summing element 618 is then demultiplexed by a demulitiplexer 620 to produce an ACK/NAK signal having 384 symbols per 20 milliseconds (19.2 ksps) appropriate for forward link transmission.

Table 1 gives the F-CPANCH code properties.

TABLE 1

F-CPANCH Code Properties

| Code (n, k) | Best possible $d_{min}$ | Achieved $d_{min}$ | Codewords Weight | Number |
|---|---|---|---|---|
| (6, 1) | 6 | 6 | 0 | 1 |
|  |  |  | 6 | 1 |
| (6, 2) | 4 | 4 | 0 | 1 |
|  |  |  | 4 | 3 |
| (6, 3) | 3 | 3 | 0 | 1 |
|  |  |  | 3 | 4 |
|  |  |  | 4 | 3 |
| (6, 4) | 2 | 2 | 0 | 1 |
|  |  |  | 2 | 3 |
|  |  |  | 3 | 8 |
|  |  |  | 4 | 3 |
|  |  |  | 6 | 1 |

An efficient and reliable acknowledgement scheme can improve the utilization of the reverse link, and may also allow data frames to be transmitted at lower transmit power. For example, without retransmission, a data frame needs to be transmitted at a higher power level ($P_1$) required to achieve one percent frame error rate (1% FER). If retransmission is used and is reliable, a data frame may be transmitted at a lower Dower level ($P_2$, required to achieve 10% FER. The 10% erased frames may be retransmitted to achieve an overall 1% FER for the transmission (i.e., 10%×10%=1%). Moreover, retransmission provides time diversity, which may improve performance. The retransmitted frame may also be combined with the initial transmission of the frame at the base station, and the combined power from the two transmissions may also improve performance. The recombining may allow an erased frame to be retransmitted at a lower power level Those of skill in the art will understand that method steps could be interchanged without departing from the scope of the invention. Those of skill in the art will also understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and steps of a technique described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit and scope of the invention. Thus, the present invention is not intended to be limited to the embodiments shown herein but is to be accorded the widest scope consistent with the principles and novel features disclosed herein.

What is claimed is:

1. An acknowledgement method in a wireless communication system, comprising:
    receiving a reverse link traffic channel data frame;
    transmitting an acknowledgement (ACK) signal if quality of the received data frame is indicated as being good; and
    transmitting a negative acknowledgement (NAK) signal only if the received data frame is indicated as being bad but has enough energy such that, if combined with energy from retransmission of the data frame, it would be sufficient to permit correct decoding of the data frame.

2. The method of claim 1, wherein the reverse link traffic channel is a reverse supplemental channel (R-SCH).

3. The method of claim 1, further comprising:
    determining the quality of the received data frame.

4. The method of claim 3, wherein determining the quality of the received data frame includes indicating the quality of the frame as being good when a reverse link pilot signal has enough energy to permit correct decoding of the frame.

5. The method of claim 1, further comprising:
    transmitting a traffic-to-pilot ratio (T/P) delta along with the NAK signal.

6. The method of claim 5, further comprising:
    adjusting an energy level of the data frame using the T/P delta.

7. The method of claim 6, further comprising:
    retransmitting the adjusted data frame if the NAK signal is indicated.

8. The method of claim 1, wherein receiving and transmitting are performed by a secondary base station.

9. A method in a wireless communication system, comprising:
    transmitting a reverse link traffic channel data frame;
    receiving an acknowledgement (ACK) signal if quality of the transmitted data frame is indicated as being good; and
    receiving a negative acknowledgement (NAK) signal only if the transmitted data frame is indicated as being bad but has enough energy such that, if combined with energy from retransmission of the data frame, it would be sufficient to permit correct decoding of the data frame.

10. The method of claim 9, wherein transmitting and receiving are performed by a remote terminal.

11. An acknowledgement method in a wireless communication system, comprising:
    receiving a reverse supplemental channel (R-SCH) data frame;
    transmitting a negative acknowledgement (NAK) signal if quality of the received R-SCH data frame is indicated as being bad; and enabling a remote terminal to recognize an absence of acknowledgement as an acknowledgement (ACK) signal to indicate that the quality of the received R-SCH frame is good.

12. The method of claim 11, wherein the acknowledgement method is performed by a best base station.

13. The method of claim 12, further comprising:
transmitting an acknowledgement (ACK) signal to the remote terminal when there is a conflict between the remote terminal and the best base station as to which base station is the best base station.

14. The method of claim 11, further comprising:
determining the quality of the received R-SCH frame.

15. The method of claim 14, wherein determining the quality of the received R-SCH frame includes indicating the quality of the frame as being bad when energy of the R-SCH frame, combined with retransmission energy, would be insufficient to permit correct decoding of the frame.

16. The method of claim 11, wherein transmitting a NAK signal includes transmitting a traffic-to-pilot ratio (T/P) delta if the received R-SCH frame has enough energy such that, if combined with energy from retransmission of the R-SCH frame, it would be sufficient to permit correct decoding of the frame.

17. The method of claim 16, further comprising:
adjusting an energy level of the R-SCH frame using the T/P delta.

18. The method of claim 17, further comprising:
retransmitting the adjusted R-SCH frame if the NAK signal is received.

19. A wireless communication system operating an acknowledgement channel, comprising:
a base device configured to receive a reverse supplemental channel (R-SCH) frame, the base device operating to transmit an acknowledgement (ACK) signal if quality of the received R-SCH frame is indicated as being good; and
a remote device configured to transmit the R-SCH frame to the base device, the remote device operating to receive the ACK signal, and to recognize an absence of acknowledgement as a negative acknowledgement (NAK) signal to indicate that the quality of the received R-SCH frame is bad.

20. The apparatus of claim 19, wherein the base device includes a quality determination element configured to determine the quality of the received R-SCH frame.

21. The apparatus of claim 19, wherein the base device includes a power controller configured to compute and transmit the NAK signal with a T/P delta if the received R-SCH frame has enough energy such that, if combined with energy from retransmission of the R-SCH frame, it would be sufficient to permit correct decoding of the frame.

22. The apparatus of claim 21, wherein the remote device includes an energy level adjuster configured to adjust an energy level of the R-SCH frame using the received T/P delta, and to retransmit the R-SCH frame to the base device.

23. The apparatus of claim 19, wherein the base device is a secondary base device.

24. A wireless communication system having a forward link acknowledgement channel, comprising:
a base device configured to receive a reverse supplemental channel (R-SCH) frame, the base device operating to transmit a negative acknowledgement (NAK) signal if quality of the received R-SCH frame is indicated as being bad; and
a remote device configured to transmit the R-SCH frame to the base device, the remote device operating to receive the NAK signal, and to recognize an absence of acknowledgement as an acknowledgement (ACK) signal to indicate that the quality of the received R-SCH frame is good.

25. The apparatus of claim 24, wherein the base device includes a quality determination element configured to determine the quality of the received R-SCH frame.

26. The apparatus of claim 24, wherein the base device includes a power controller configured to compute and transmit the NAK signal with a T/P delta if the quality of the received R-SCH frame is bad but has enough energy such that, if combined with energy from retransmission of the R-SCH frame, it would be sufficient to permit correct decoding of the frame.

27. The apparatus of claim 24, wherein the base device is a best base device having a smallest path loss to the remote device.

28. A base station for a wireless communication system, the base station comprising:
an RF front end configured to receive and appropriately amplify, filter, and process a reverse supplemental channel (R-SCH) frame from a remote terminal or remote terminals; and
a digital signal processor (DSP) adapted to demodulate and further process the received R-SCH frame, the DSP configured to direct the RF front end to transmit an acknowledgement (ACK) signal if quality of the received R-SCH frame is indicated as being good, the DSP configured to direct the RF front end to transmit a negative acknowledgement (NAK) signal only if the received data frame is indicated as being bad but has enough energy such that, if combined with energy from retransmission of the data frame, it would be sufficient to permit correct decoding of the data frame.

29. The base station of claim 28, wherein the DSP includes a quality determination element configured to determine the quality of the received R-SCH frame.

30. The base station of claim 28, wherein the DSP includes a power controller configured to compute and direct the RF front end to transmit the NAK signal with the T/P delta to the remote terminal if the received R-SCH frame has enough energy such that, if combined with energy from retransmission of the R-SCH frame, it would be sufficient to permit correct decoding of the frame.

31. The base station of claim 28, wherein the base station is a secondary base station.

32. A base station for a wireless communication system, the base station comprising:
an RF front end configured to receive and appropriately amplify, filter, and process a reverse supplemental channel (R-SCH) frame from a remote terminal or remote terminals; and
a digital signal processor (DSP) adapted to demodulate and further process the received R-SCH frame, the DSP configured to direct the RF front end to transmit a negative acknowledgement (NAK) signal if quality of the received R-SCH frame is indicated as being bad, the DSP configured to enable the remote terminal to recognize an absence of an acknowledgement (ACK) signal as indicating acknowledgement of receipt of the R-SCH frame at the base station.

33. The base station of claim 32, wherein the base station is a best base station with a smallest path loss to the remote terminal.

34. A wireless remote terminal for a communications system, the remote terminal comprising:

an RF front end configured to transmit a reverse supplemental channel (R-SCH) frame to a base station, the RF front end configured to receive and appropriately amplify, filter, and process an acknowledgement (ACK) signal from the base station to indicate that quality of the R-SCH frame received at the base station is good, and to recognize an absence of acknowledgement as a negative acknowledgement (NAK) signal to indicate that the quality of the R-SCH frame received at the base station is bad; and a digital signal processor (DSP) adapted to demodulate and further process the received ACK signal.

35. A wireless remote terminal for a communications system, the remote terminal comprising:

an RF front end configured to transmit a reverse supplemental channel (R-SCH) frame to a best base station, the RF front end configured to receive and appropriately amplify, filter, and process a negative acknowledgement (NAK) signal from the base station to indicate that quality of the R-SCH frame received at the base station is bad, and to recognize an absence of acknowledgement as an acknowledgement (ACK) signal to indicate that the quality of the R-SCH frame received at the base station is good; and a digital signal processor (DSP) adapted to demodulate and further process the received NAK signal.

36. A forward link acknowledgement channel driver for a wireless communication, the driver comprising:

a block encoder configured to receive an ACK/NAK message having at least one bit, the block encoder operating to encode the ACK/NAK message with a generator matrix to produce a codeword;

a first mapper configured to map the codeword into a first binary signal; and a first mixer configured to mix the first binary signal with a first orthogonal spreading code.

37. The driver of claim 36, further comprising:

a delay element configured to provide a sequence delay of one frame period, the delay element configured to delay the codeword by one frame period;

a second mapper configured to map the delayed codeword into a second binary signal; and a second mixer configured to mix the second binary signal with a second orthogonal spreading code.

38. The driver of claim 37, further comprising:

a summing element configured to sum outputs of the first and second mixer.

39. The driver of claim 38, further comprising:

a demultiplexer to demultiplex an output of the summing element to produce an ACK/NAK signal appropriate for forward link transmission.

40. The driver of claim 36, wherein the acknowledgement channel is a Forward Common Packet Acknowledgement Channel (F-CPANCH).

41. The driver of claim 36, wherein the generator matrix for a one-bit ACK/NAK is [1 1 1 1 1 1].

42. The driver of claim 36, wherein the generator matrix for a two-bit ACK/NAK is $$\begin{bmatrix} 1 & 1 & 1 & 1 & 0 & 0 \\ 0 & 0 & 1 & 1 & 1 & 1 \end{bmatrix}.$$

43. The driver of claim 36, wherein the generator matrix for a three-bit ACK/NAK is $$\begin{bmatrix} 1 & 0 & 1 & 1 & 0 & 0 \\ 0 & 1 & 0 & 1 & 1 & 0 \\ 0 & 0 & 1 & 0 & 1 & 1 \end{bmatrix}.$$

44. The driver of claim 36, wherein the generator matrix for a four-bit ACK/NAK is $$\begin{bmatrix} 1 & 1 & 1 & 0 & 0 & 0 \\ 0 & 1 & 1 & 1 & 0 & 0 \\ 0 & 0 & 1 & 1 & 1 & 0 \\ 0 & 0 & 0 & 1 & 1 & 1 \end{bmatrix}.$$

45. The driver of claim 36, wherein the orthogonal spreading code is a Walsh code.

* * * * *